US008929952B2

(12) United States Patent
Kanou

(10) Patent No.: US 8,929,952 B2
(45) Date of Patent: Jan. 6, 2015

(54) WIRELESS COMMUNICATION APPARATUS

(75) Inventor: Hideto Kanou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1093 days.

(21) Appl. No.: 12/521,534

(22) PCT Filed: Dec. 26, 2007

(86) PCT No.: PCT/JP2007/075022
§ 371 (c)(1),
(2), (4) Date: Mar. 9, 2010

(87) PCT Pub. No.: WO2008/078792
PCT Pub. Date: Jul. 3, 2008

(65) Prior Publication Data
US 2010/0189031 A1 Jul. 29, 2010

(30) Foreign Application Priority Data
Dec. 27, 2006 (JP) ................... 2006-353127

(51) Int. Cl.
*H04M 1/00* (2006.01)
*H01Q 1/24* (2006.01)
*H04B 1/44* (2006.01)

(52) U.S. Cl.
CPC . *H01Q 1/24* (2013.01); *Y02B 60/50* (2013.01); *H04B 1/44* (2013.01)
USPC ............................. 455/562.1; 455/561; 455/82

(58) Field of Classification Search
CPC ..................................... H01Q 1/24; H04B 1/44
See application file for complete search history.

(56) References Cited

U.S. PATENT DOCUMENTS

| 6,567,653 | B1 * | 5/2003 | Sanders | 455/126 |
| 7,142,884 | B2 | 11/2006 | Hagn | |
| 2002/0090974 | A1 | 7/2002 | Hagn | |
| 2004/0018819 | A1 * | 1/2004 | Coan | 455/83 |
| 2004/0047306 | A1 | 3/2004 | Katagishi et al. | |
| 2004/0203552 | A1 * | 10/2004 | Horiuchi et al. | 455/333 |
| 2005/0057426 | A1 * | 3/2005 | Itkin | 343/876 |
| 2005/0277387 | A1 * | 12/2005 | Kojima et al. | 455/78 |

FOREIGN PATENT DOCUMENTS

| JP | 2002185356 A | 6/2002 |
| JP | 2002325049 A | 11/2002 |
| JP | 2003188759 A | 7/2003 |
| JP | 2004023536 A | 1/2004 |
| JP | 2004526337 A | 8/2004 |

OTHER PUBLICATIONS

International search report for corresponding PCT application PCT/JP2007/075022 lists the references above.

* cited by examiner

*Primary Examiner* — Zhiyu Lu
(74) *Attorney, Agent, or Firm* — Studebaker & Brackett PC

(57) ABSTRACT

A wireless communication apparatus of the present invention comprises a switching unit, provided between a transmitting circuit and/or a receiving circuit of at least one communication system and a demultiplexer, for connecting the transmitting circuit and/or the receiving circuit of the communication system to antenna either directly or by way of the demultiplexer. When a communication system having the switching unit is solely operated, the transmitting circuit and/or the receiving circuit of the operating communication system is connected directly to the antenna without the demultiplexer. Therefore, it is possible to reduce insertion loss of the circuit and thus to improve receiving sensitivity and reduce power consumption.

2 Claims, 14 Drawing Sheets

WIRELESS COMMUNICATION APPARATUS

CROSS REFERENCE TO RELATED APPLICATION

The present application is a national stage of international application No. PCT/JP2007/075022 filed on Dec. 26, 2007. This application also claims priority to and the benefit of Japanese Patent Application No. 2006-353127 filed on Dec. 27, 2006, the entire contents of which are incorporated herein by reference.

TECHNICAL FIELD

The present invention relates to a wireless communication apparatus.

BACKGROUND ART

As wireless communication systems for a cellular phone or the like, there presently are a plurality of systems corresponding to each standard. Cellular phone systems widely used in Japan are, for example, PDC (Personal Digital Cellular), CDMA (Code Division Multiple Access), PHS (Personal Handyphone System) and the like. In addition, WiMAX (Worldwide Interoperability for Microwave Access) is becoming popular as one of new systems being suggested in recent years for a wireless broad band that takes a crucial part in ubiquitous age.

Although the wireless communication apparatus normally corresponds to one of standards, it is becoming popular to have a multiband or a multimode wireless communication apparatus because of popularization of the cellular phones accompanied by tightening of the frequency range allocated to each system and, for example, a dual band communication apparatus capable of accepting two different communication systems of PDC and W-CDMA (Wideband Code Division Multiple Access) is known (see Patent Documents 1 and 2, for example). Recently, there is being developed a wireless communication apparatus capable of hybrid performance such as hand-off between different frequency ranges or seamless hand-off between different systems in order to provide a stable and highly functional service.

Shown in FIG. 10 is a block diagram illustrating an example of a conventional wireless communication apparatus used for the CDMA system. The wireless communication apparatus 100-1 has CDMA system of 800 MHz band (for example, ARIB STD-T53: Association of Radio Industries and Businesses STANDARD-T53) and CDMA system of 2 GHz band (for example, ARIB STD-T64). Furthermore, the diversity scheme is adopted for data communication (for example, cdma2000 1×EV-DO: 1× Evolution Data Optimized) of both the CDMA system of 800 MHz band and the CDMA system of 2 GHz band for the purpose of either improvement in throughput or hybrid performance.

As shown in FIG. 10, the CDMA system of 800 MHz band is provided with a transmitting circuit 101, a receiving circuit 102, a duplexer (DUP) 103 for separating transmitted and received signals of 800 MHz band, and a secondary receiving circuit 121, while the CDMA system of 2 GHz band is provided with a transmitting circuit 111, a receiving circuit 112, a duplexer (DUP) 113 for separating transmitted and received signals of 2 GHz band, and a secondary receiving circuit 131.

As common units for both of the CDMA systems, the wireless communication apparatus 100-1 has a primary antenna (ANT) 151, a first external connector 152 comprising a measuring RF (Radio Frequency) connector for instance, a diplexer (Dip) 153 for sharing the primary antenna 151 with 800 MHz band and 2GHz band, a secondary antenna (ANT) 161, a first external connector 162 comprising a measuring RF connector, and a diplexer (Dip) 163 for sharing the secondary antenna 161 by the secondary receiving circuit 121 of 800 MHz band and the secondary receiving circuit 131 of 2 GHz band.

The transmitting circuit 101, the receiving circuit 102 and the secondary receiving circuit 121 of the CDMA system of 800 MHz band are connected to a baseband unit 500. Likewise, the transmitting circuit 111, the receiving circuit 112 and the secondary receiving circuit 131 of the CDMA system of 2 GHz band are connected to the baseband unit 500.

For 1×EV-DO communication with the CDMA system of 800 MHz band, for instance, by the wireless communication apparatus 100-1 shown in FIG. 10, the transmitted signal from the transmitting circuit 101 is radiated from the primary antenna 151 by way of the duplexer 103 and the diplexer 153, while the received signal of 800 MHz band received by the primary antenna 151 is received by the receiving circuit 102 by way of the diplexer 153 and the duplexer 103. Furthermore, the received signal of 800 MHz band received by the secondary antenna 161 is diversity received by the receiving circuit 121 by way of the diplexer 163.

Similarly, for 1×EV-DO communication with the CDMA system of 2 GHz band by the wireless communication apparatus 100-1, the transmitted signal from the transmitting circuit 111 is radiated from the primary antenna 151 by way of the duplexer 113 and the diplexer 153, while the received signal of 2 GHz band received by the primary antenna 151 is received by the receiving circuit 112 by way of the diplexer 153 and the duplexer 113. Furthermore, the received signal of 2 GHz band received by the secondary antenna 161 is diversity received by the receiving circuit 131 by way of the diplexer 163.

The wireless communication apparatus 100-1 monitors a voice incoming call by regularly receiving notification information (paging) notifying the call from a base station in 1× communication. Therefore, during 1×EV-DO communication with either the CDMA system of 800 MHz band or the CDMA system of 2 GHz band, the wireless communication apparatus 100-1 regularly switches the system to 1× communication at the side of the primary antenna 151 to receive paging, or maintains 1×EV-DO communication at the side of primary antenna 151 to improve throughput and regularly switches the system to 1× communication at the side of the secondary antenna 161 to receive paging.

Shown in FIG. 11 is a block diagram illustrating another example of a conventional wireless communication apparatus used for the CDMA system. The wireless communication apparatus 100-2 is provided with an antenna switch 172 having four contact points a to d instead of the diplexer 153 in FIG. 10. The antenna switch 172 is controlled based on a control signal from the baseband unit 500 so that only the duplexer 103 is connected to the primary antenna 151 by way of the contact point a or to a secondary external connector (Ext) 171 serving as an external antenna connecting interface to which an external antenna can be connected, by way of the contact point b, or so that only the duplexer 113 is connected to the primary antenna 151 by way of the contact point c, or to the secondary external connector 171 by way of the contact point d. The primary antenna 151 and the secondary external connector 171 are thus shared by both the CDMA systems of 800 MHz band and of 2 GHz band. Since other constitutions and performances are the same as those of the wireless communication apparatus 100-1 in FIG. 10, the corresponding units are provided with the same reference symbols and the descriptions thereof will be omitted.

Shown in FIG. 12 is a block diagram illustrating an example of a conventional wireless communication apparatus used for the WiMAX system. The wireless communication apparatus 200 is for the WiMAX communication of 2.5 GHz band and provided with a transmitting circuit 201, a receiving circuit 202, a switch 253 with two contact points a and b, and an antenna (ANT) 251. The transmitting circuit 201 and the receiving circuit 202 are connected to the baseband unit 500. A complex communication system adopted by the WiMAX system is not Frequency Division Duplex (FDD) adopted for the CDMA system shown in FIG. 10 and FIG. 11 but Time Division Duplex (TDD). The wireless communication apparatus 200 thus controls the switch 253 based on the control signal from the baseband unit 500 in synchronization with transmitting and receiving so that the transmitted signal from the transmitting circuit 201 is radiated from the antenna 251 by way of the contact point a of the switch 253 in a transmitting frame (uplink) and the received signal received by the antenna 251 is received by the receiving circuit 202 by way of the contact point b of the switch 253 in a receiving frame (downlink).

The wireless communication apparatus 200 shown in FIG. 12 is further provided with an antenna (ANT) 261 and a secondary receiving circuit 211 to perform diversity receiving. The secondary receiving circuit 211 is connected to the baseband unit 500. A first external connector 252 comprising a measuring RF connector is provided between the antenna 251 and the switch 253, while a first external connector 262 comprising a measuring RF connector is also provided between the antenna 261 and the secondary receiving circuit 211.

A multimode wireless communication apparatus usable for both the CDMA system and the WiMAX system is conceivable as another wireless communication apparatus. When seamless hand-off between systems or the like is performed in such multimode wireless communication apparatus, it is necessary to run both systems simultaneously. It is preferable for each of the systems to share the same antenna in light of downsizing and the cost.

A multimode wireless communication apparatus 300 shown in FIG. 13 is suggested as an example of such multimode wireless communication apparatus. The multimode wireless communication apparatus 300 is a combination of the wireless communication apparatus 100-1 of the CDMA system shown in FIG. 10 and the wireless communication apparatus 200 of the WiMAX system of 2.5 GHz band shown in FIG. 12. As shown in FIG. 13, each antenna terminal of the duplexer 103 of the CDMA system of 800 MHz band, of the duplexer 113 of the CDMA system of 2 GHz band and of the switch 253 of the WiMAX system of 2.5 GHz band is connected, by way of a triplexer (Tri) 353, to an antenna (ANT) 351 that accepts three bands of 800 MHz band, 2 GHz band and 2.5 GHz. A first external connector 352 comprising a measuring RF connector is provided between the triplexer 353 and the antenna 351.

An antenna (ANT) 361 that accepts three bands is connected, by way of a triplexer (Tri) 363, to secondary receiving circuits 121, 131 and 211 corresponding to each band. A first external connector 362 comprising a measuring RF connector is provided between the antenna 361 and the triplexer 363.

The transmitting circuit 101, the receiving circuit 102 and the secondary receiving circuit 121 of the CDMA system of 800 MHz band are connected to the baseband unit 500, and so are the transmitting circuit 111, the receiving circuit 112 and the secondary receiving circuit 131 of the CDMA system of 2 GHz band and the transmitting circuit 201, the receiving circuit 202 and the secondary receiving circuit 211 of the WiMAX system of 2.5 GHz band.

A multimode wireless communication apparatus 300 shown in FIG. 13 is provided with the triplexer 353 to share the antenna 351 among the CDMA system of 800 MHz band, the CDMA system of 2 GHz band and the WiMAX system of 2.5 GHz band and also provided with the triplexer 363 to share the antenna 361 among the secondary receiving circuits 121, 131 and 211 of each system.

FIG. 14 shows another example of the multimode wireless apparatus. The multimode wireless communication apparatus 400 is a combination of the wireless communication apparatus 100-2 of the CDMA system shown in FIG. 11 and the wireless communication apparatus 200 of the WiMAX system of 2.5 GHz band shown in FIG. 12. That is, in addition to the constitution shown in FIG. 13, in the multimode wireless communication apparatus 400, the antenna terminal of the triplexer 353 is provided with an antenna switch 451 having two contact points a and b. The antenna switch 451 is controlled based on the control signal from the baseband unit 500 to selectively turn on the switch at the contact point a or b, thereby the antenna 351 and the second external connector 171 are shared among the CDMA system of 800 MHz band, the CDMA system of 2 GHz band and the WiMAX system of 2.5 GHz band. Other constitution is the same as that of the multimode wireless apparatus 300 in FIG. 13.

Patent Document 1: Japanese Patent Laid-Open No. 2003-188759
Patent Document 2: Japanese Patent Laid-Open No. 2004-023536

DISCLOSURE OF THE INVENTION

Problems to be Solved by the Invention

However, the multimode wireless communication apparatus having constitution shown in FIG. 13 and FIG. 14 requires a demultiplexer such as a triplexer to share an antenna by each system. Thus, it has been a concern that insertion loss of a circuit is increased, resulting in degradation of receiving sensitivity and increase of power consumption.

In consideration of such problems, therefore, an object of the present invention is to provide a wireless communication apparatus capable of reducing insertion loss of a circuit and thus improving receiving sensitivity and reducing power consumption.

Summary of the Invention

In order to achieve the above object, a first aspect of the present invention is to provide a wireless communication apparatus comprising:

an antenna;

a demultiplexer provided in downstream of the antenna for demultiplexing signals in different frequency ranges of a plurality of communication systems;

a transmitting circuit and/or a receiving circuit of the each communication system provided in downstream of the demultiplexer;

a switching unit provided between the transmitting circuit and/or the receiving circuit of at least one communication system and the demultiplexer for switching a connection of the transmitting circuit and/or the receiving circuit of the communication system either to the antenna by way of the demultiplexer or to the antenna directly without the demultiplexer; and a control unit for controlling the switching unit so that, when a plurality of communication systems including a communication system having the switching unit are simultaneously operated, the transmitting circuit and/or the receiving circuit of each operating communication system is connected to the antenna by way of the demultiplexer and, when a communication system having the switching unit is solely operated, the transmitting circuit and/or the receiving circuit of the operating communication system is connected directly to the antenna without the demultiplexer.

A second aspect of the present invention is to provide the wireless communication apparatus according to the first aspect, further comprising a matching circuit provided between the demultiplexer and the switching unit, wherein the switching unit is arranged so that the transmitting circuit and/or the receiving circuit of the corresponding communication system is connected to the antenna also by way of the matching circuit when connected to the antenna by way of the demultiplexer.

Furthermore, a third aspect of the present invention for achieving the above object is to provide a wireless communication apparatus comprising:

an antenna;

a demultiplexer provided in downstream of the antenna for demultiplexing signals in different frequency ranges of a plurality of communication systems;

a transmitting circuit and/or a receiving circuit of the each communication system provided in downstream of the demultiplexer;

an external antenna connecting interface to which an external antenna can be connected;

an external antenna switching unit provided between the external antenna connecting interface and the demultiplexer for switching a connection of the demultiplexer either to the antenna or to the external antenna connecting interface;

a switching unit provided between the transmitting circuit and/or the receiving circuit of at least one communication system and the demultiplexer for switching the connection of the transmitting circuit and/or the receiving circuit of the communication system either to the external antenna switching unit by way of the demultiplexer or to the external antenna switching unit directly without the demultiplexer; and a control unit for controlling the switching unit so that, when a plurality of communication systems including a communication system having the switching unit are simultaneously operated, the transmitting circuit and/or the receiving circuit of each operating communication system is connected to the external antenna switching unit by way of the demultiplexer and, when a communication system having the switching unit is solely operated, the transmitting circuit and/or the receiving circuit of the operating communication system is connected directly to the external antenna switching unit without the demultiplexer.

A fourth aspect of the present invention is to provide the wireless communication apparatus according to the third aspect, further comprising a matching circuit provided between the demultiplexer and the switching unit, wherein the switching unit is arranged so that the transmitting circuit and/or the receiving circuit of the corresponding communication system is connected to the external antenna switching unit also by way of the matching circuit when connected to the external antenna switching unit by way of the demultiplexer.

Effect of the Invention

According to the present invention, there is provided, between a transmitting circuit and/or a receiving circuit of at least one communication system and a demultiplexer, a switching unit where the transmitting circuit and/or the receiving circuit of the communication system is connected to an antenna or an external antenna connecting interface either directly or by way of the demultiplexer, which makes it possible, when a communication system having the switching unit is solely operated, to connect the transmitting circuit and/or the receiving circuit of the running communication system directly to the antenna or the external antenna connecting interface without the demultiplexer along the path. Therefore, it becomes possible to reduce insertion loss of the circuit when a system is solely operated and, as a result, to improve receiving sensitivity and reduce power consumption.

Figure 1:
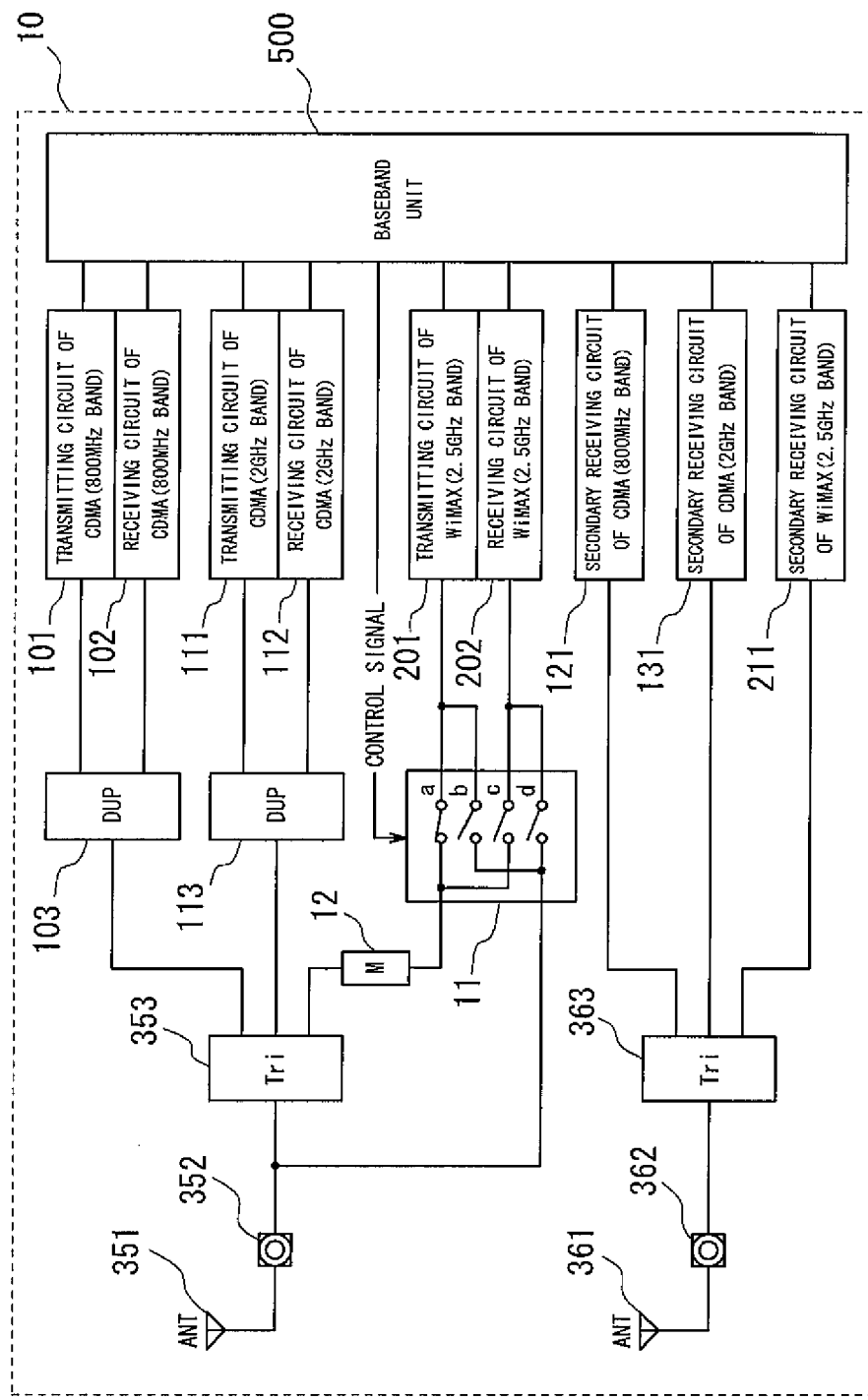
FIG. 1 is a block diagram illustrating a constitution of a main section of a multimode wireless communication apparatus of the first embodiment of the present invention.

REFERENCE SYMBOLS 10, 20, 30, 40, 50, 60 multimode wireless communication apparatus
11, 41, 61, 253 switch
12 matching circuit
31 diplexer
101 transmitting circuit (CDMA of 800 MHz)

102 receiving circuit (CDMA of 800 MHz)
103, 113 duplexer
111 transmitting circuit (CDMA of 2 GHz)
112 receiving circuit (CDMA of 2 GHz)
121 secondary receiving circuit (CDMA of 800 MHz)
131 secondary receiving circuit (CDMA of 2 GHz)
171 second external connector
201 transmitting circuit (WiMAX of 2.5 GHz)
202 receiving circuit (WiMAX of 2.5 GHz)
211 secondary receiving circuit (WiMAX of 2.5 GHz)
351, 361 antenna
352, 362 first external connector
353, 363 triplexer

DESCRIPTION OF EMBODIMENTS

Embodiments of the present invention will be described with reference to the accompanying drawings.

[Embodiment 1]

Figure 13:
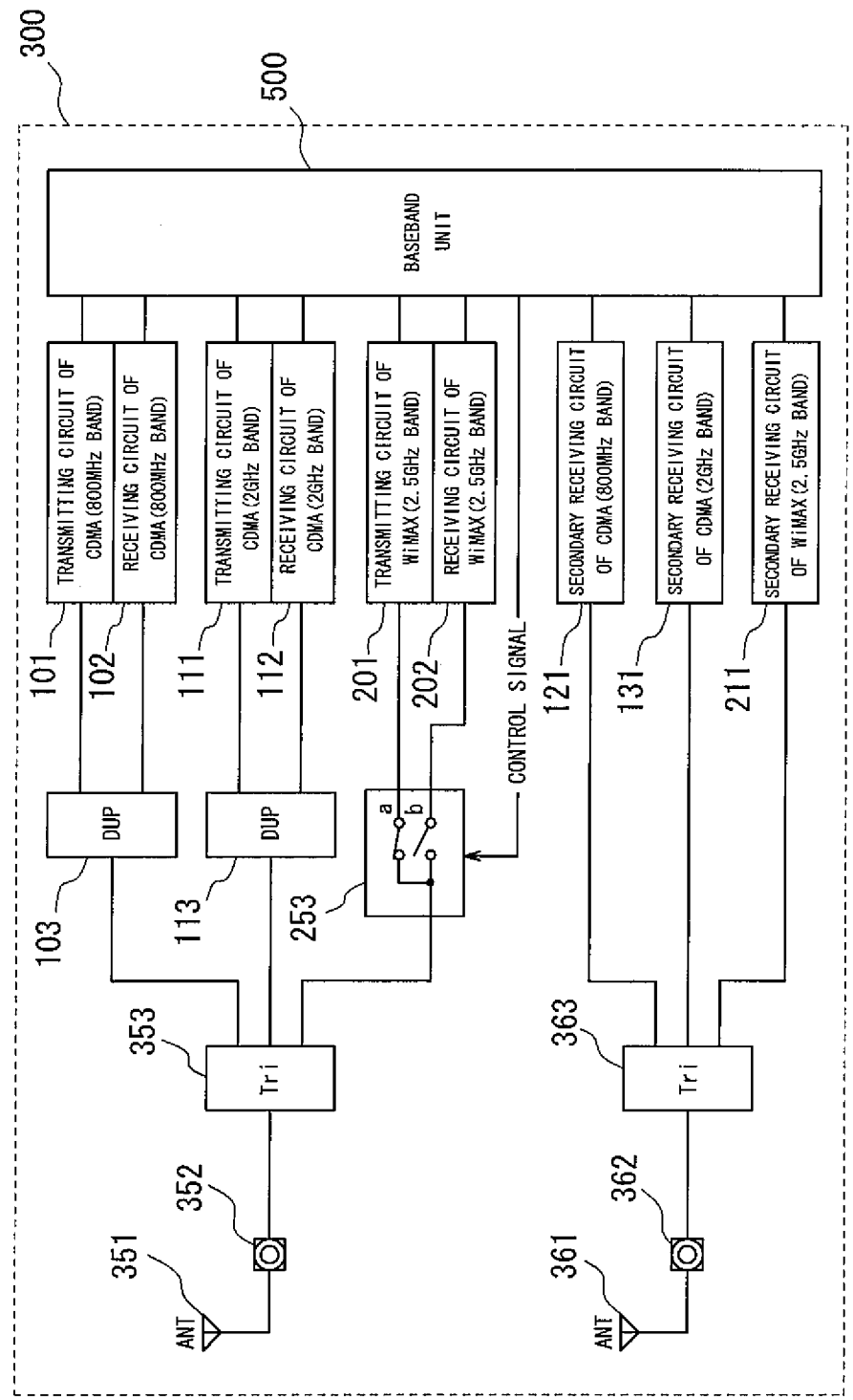
FIG. 13 is a block diagram illustrating an example of a conventional multimode wireless communication apparatus usable for both the CDMA system and the WiMAX system.

Shown in FIG. 1 is a block diagram illustrating a constitution of a main section of a multimode wireless communication apparatus of the first embodiment of the present invention. Although the multimode wireless communication apparatus 10 has a similar constitution to that shown in FIG. 13, the switch 253 is replaced with a switch 11 having four contact points a to d serving as a switching unit. The switch 11 is controlled based on a control signal from a baseband unit 500 serving as a control unit to selectively connect a transmitting circuit 201 or a receiving circuit 202 of WiMAX system of 2.5 GHz band to a triplexer 353 by way of the contact point a or c. Thereby, such circuit is connected to an antenna 351 by way of the triplexer 353 or by way of the contact point b or d without the triplexer 353.

A matching circuit (M) 12 is inserted between the switch 11 and the triplexer 353 to prevent, when the transmitting circuit 201 or the receiving circuit 202 of the WiMAX system of 2.5 GHz band is connected to the side of the antenna terminal of the triplexer 353 and an terminal at the demultiplexing side of the triplexer 353 is opened, influence on the impedance at the side of an antenna terminal. Other constitutions are the same as those in FIG. 13 and the corresponding units are thus provided with the same reference symbols and descriptions thereof will be omitted.

Figure 2:
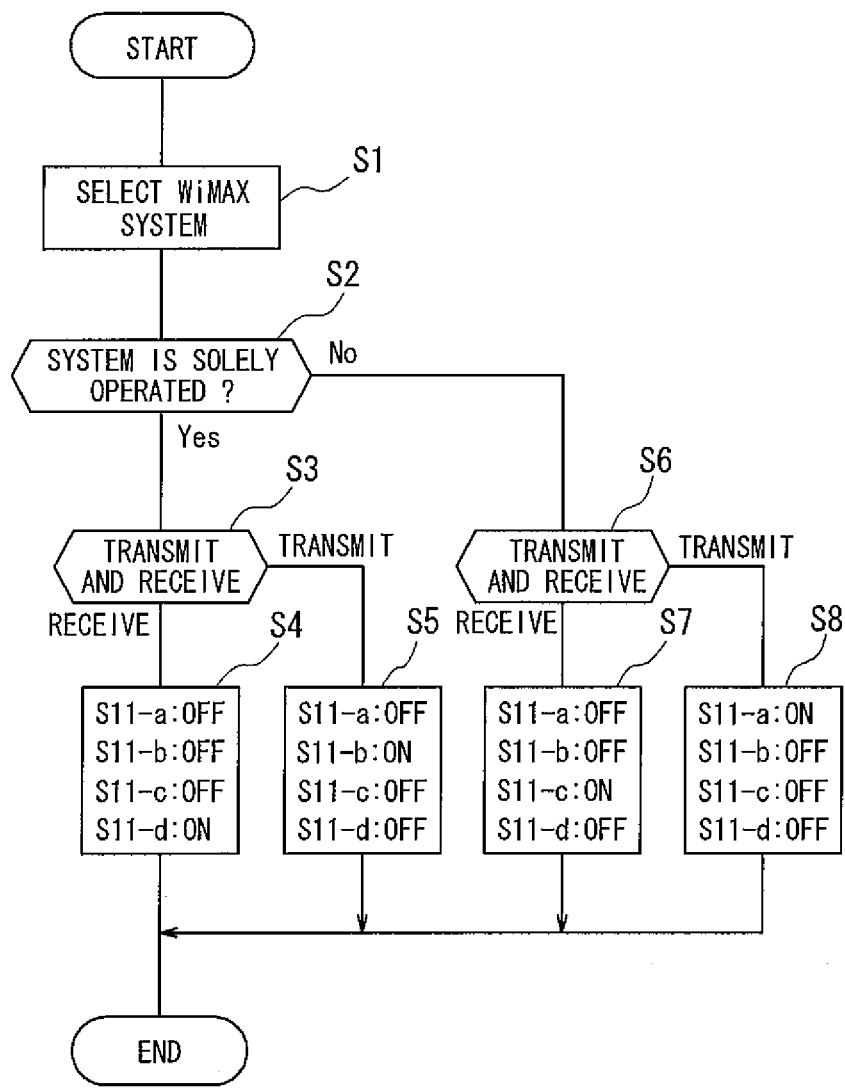
FIG. 2 is a flowchart illustrating an example of operations of the multimode wireless communication apparatus of the first embodiment.

Shown in FIG. 2 is a flowchart illustrating an example of operations of the multimode wireless communication apparatus 10 of the present embodiment. When the WiMAX system is selected (S1), the multimode wireless communication apparatus 10 of the present embodiment judges whether or not the WiMAX system is solely operated, that is, whether or not the WiMAX system of 2.5 GHz band is operated simultaneously with the CDMA systems of 800 MHz band or of 2 GHz band (S2).

When it is judged that the WiMAX system is solely operated, the switch 11 is turned on at the contact point d (S11-d:ON) and turned off at the other contact points a to c (S11-a:OFF, S11-b:OFF, S11-c:OFF) (S4) for receiving, while the switch 11 is turned on at the contact point b (S11-b:ON) and turned off at the other contact points a, c, and d (S11-a:OFF, S11-c:OFF, S11-d:OFF) (S5) for transmitting, in synchronization with transmitting and receiving. Therefore, the transmitting circuit 201 or the receiving circuit 202 is connected directly to the antenna 351 without the triplexer 353 when the WiMAX system is solely operated.

On the other hand, when it is judged at S2 that the WiMAX system and the CDMA system are simultaneously operated, that is, when hand-off between the systems or the like is performed, in synchronization with transmitting and receiving in the WiMAX system (S6), the switch 11 is turned on at the contact point c (S11-c:ON) and turned off at the other contact points a, b and d (S11-a:OFF, S11-b:OFF, S11-d:OFF) (S7) for receiving, while the switch 11 is turned on at the contact point a (S11-a:ON) and turned off at the other contact points b to d (S11-b:OFF, S11-c:OFF, S11-d:OFF) (S8) for transmitting. Therefore, the transmitting circuit 201 or the receiving circuit 202 of the WiMAX system is connected to the antenna 351 by way of the triplexer 353 when both of the WiMAX system and the CDMA system are simultaneously operated.

Figure 3:
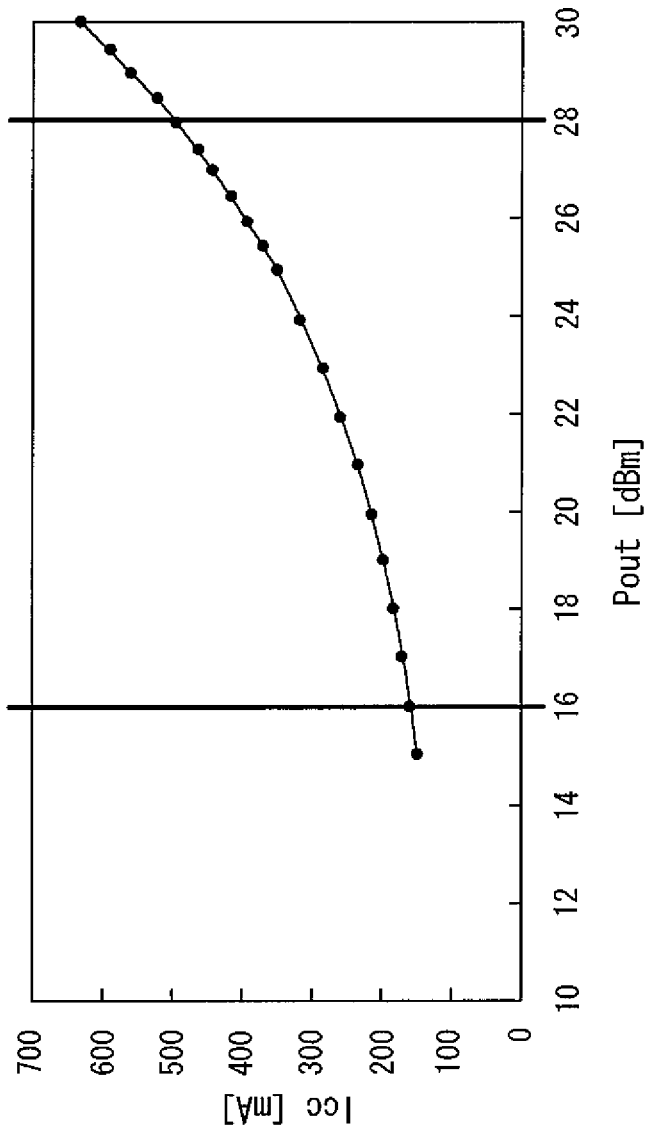
FIG. 3 is a diagram illustration an example of characteristics of output power to current of a power amplifier in a transmitting circuit of WiMAX system shown in FIG. 1.

As stated above, in the multimode wireless communication apparatus 10 of the present embodiment usable for both of the CDMA system and the WiMAX system, the transmitting circuit 201 or the receiving circuit 202 is connected to the antenna 351 without the triplexer 353 in synchronization with transmitting and receiving when the WiMAX system is solely operated. Therefore, it is possible to reduce insertion loss of the circuit and, as a result, to improve receiving sensitivity. Furthermore, the output power of a power amplifier on the transmitting circuit 201 can be reduced during transmitting, which can reduce power consumption. For example, when the power amplifier on the transmitting circuit 201 has a characteristic of output power (Pout[dBm]) to current (Icc[mA]) as shown in FIG. 3, about 50 mA of the current consumption can be reduced by lowering the output power by 1 dB.

[Embodiment 2]

Figure 4:
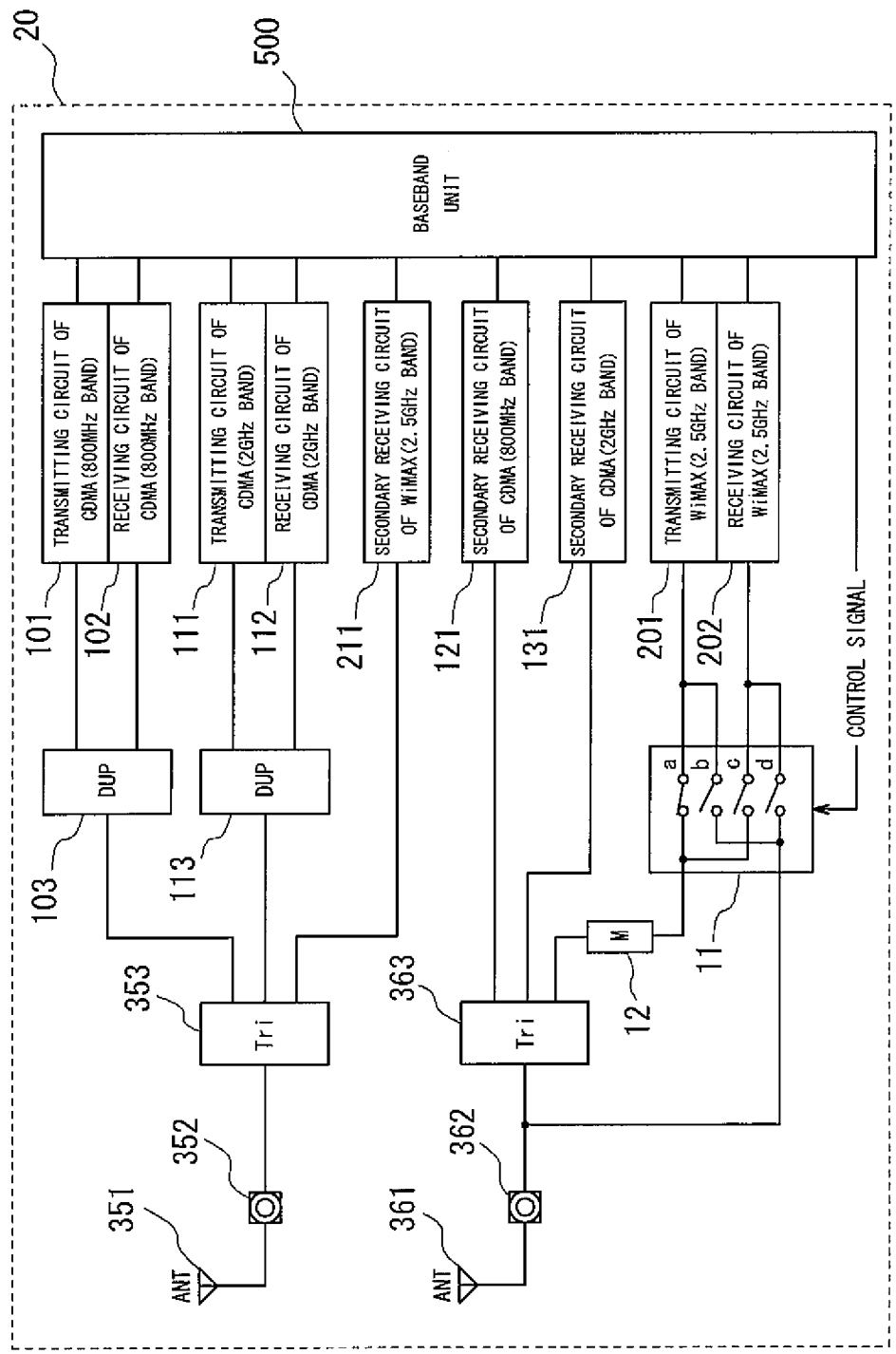
FIG. 4 is a block diagram illustrating a constitution of a main section of a multimode wireless communication apparatus of the second embodiment of the present invention.

Shown in FIG. 4 is a block diagram illustrating a constitution of a main section of a multimode wireless communication apparatus of the second embodiment of the present invention. Although the multimode wireless communication apparatus 20 has a similar constitution to that shown in FIG. 1, the transmitting circuit 201, the receiving circuit 202, the switch 11 and the matching circuit 12 of the WiMAX system are connected at the side of an antenna 361 while a secondary receiving circuit 211 of the WiMAX system is connected to the triplexer 353 at the side of the antenna 351, and the switch 11 is controlled in the same manner as in the first embodiment. Other constitutions and performances are the same as those of the first embodiment.

According to the multimode wireless communication apparatus 20 of the present embodiment, the transmitting circuit 201 or the receiving circuit 202 is connected to the antenna 361 without the triplexer 363 in synchronization with transmitting and receiving when the WiMAX system is solely operated. Therefore, it is possible, similarly to the case of the first embodiment, to reduce insertion loss of the circuit and, as a result, to improve receiving sensitivity and reduce power consumption.

[Embodiment 3]

Figure 5:
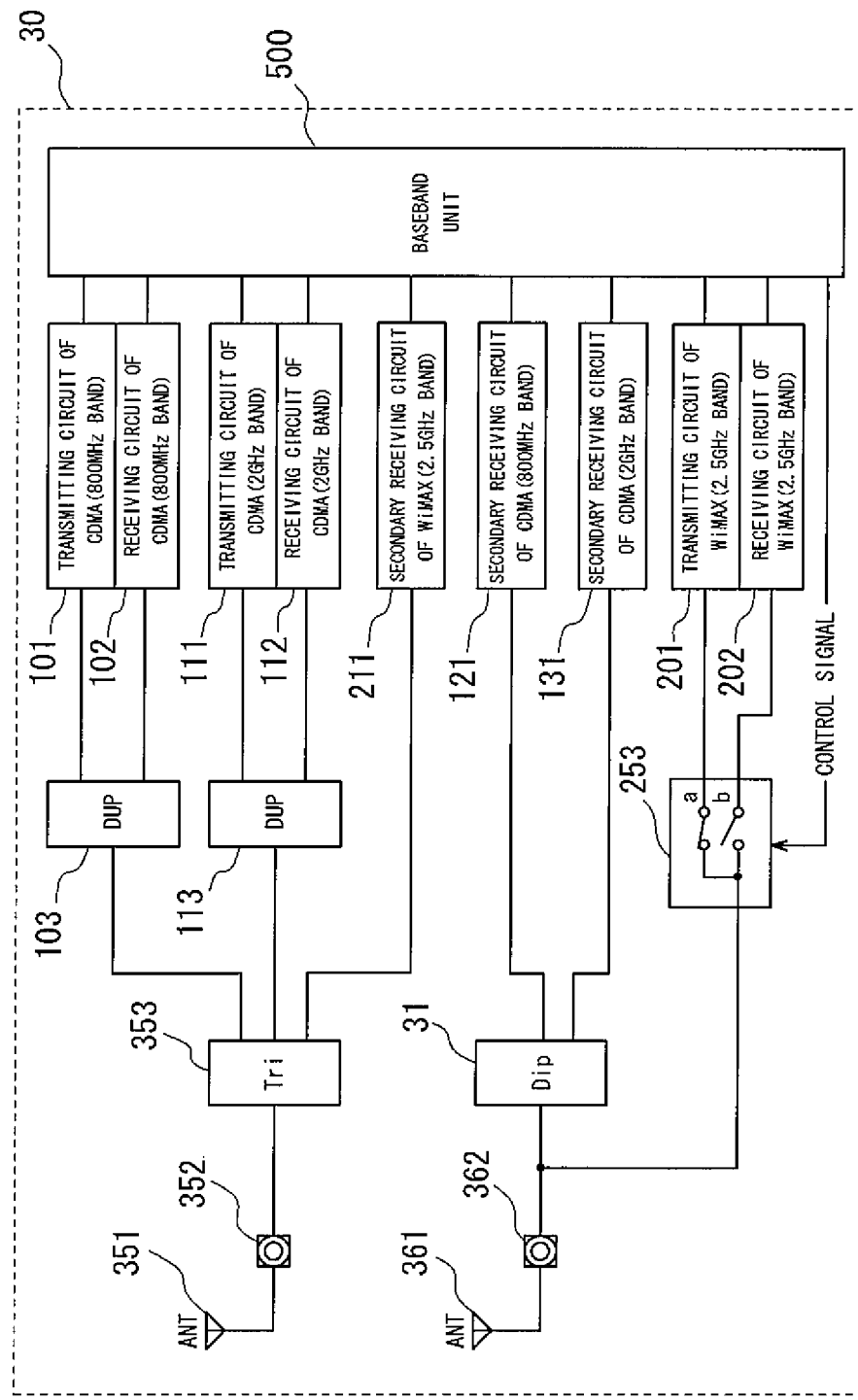
FIG. 5 is a block diagram illustrating a constitution of a main section of a multimode wireless communication apparatus of the third embodiment of the present invention.

Shown in FIG. 5 is a block diagram illustrating a constitution of a main section of a multimode wireless communication apparatus of the third embodiment of the present invention. Although the multimode wireless communication apparatus 30 has a similar constitution to that shown in FIG. 4, the matching circuit 12 is removed and the switch 11 and the triplexer 363 are replaced with a switch 253 and a diplexer 31 respectively. A secondary receiving circuit 121 of the CDMA system of 800 MHz band and a secondary receiving circuit 131 of the CDMA system of 2 GHz band are connected to the antenna 361 by way of the diplexer 31, while the transmitting circuit 201 and the receiving circuit 202 of the WiMAX system are connected to an antenna terminal of the diplexer 31 by way of the switch 253.

More specifically, in the present embodiment, the transmitting circuit 201 and the receiving circuit 202 of the WiMAX system are connected to the antenna 361 without the diplexer 31 not only when the WiMAX system is solely operated but also when the WiMAX system and the CDMA system are simultaneously operated to perform hand-off therebetween or the like. It is thus prohibited to receive with the secondary receiving circuit of the CDMA system, namely diversity receiving when the WiMAX system and the CDMA system are simultaneously operated.

Figure 6:
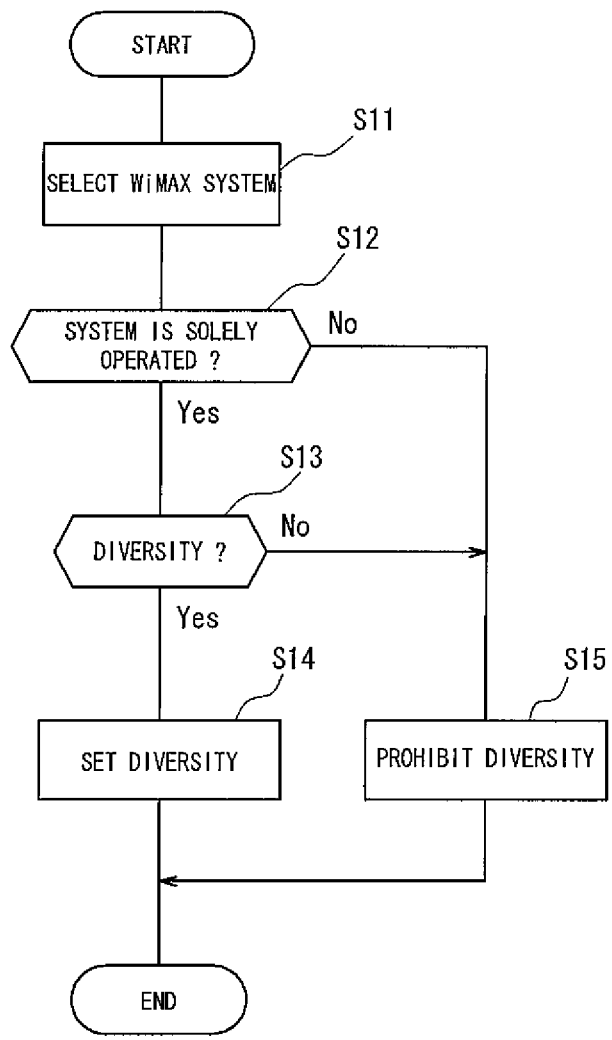
FIG. 6 is a flowchart illustrating an example of operations of the multimode wireless communication apparatus of the third embodiment.

Shown in FIG. 6 is a flowchart illustrating an example of operations of the multimode wireless communication apparatus 30 of the present embodiment. When the WiMAX system is selected (S11), the multimode wireless communication apparatus 30 of the present embodiment judges whether or not the WiMAX system is solely operated, that is, whether or not the WiMAX system is operated simultaneously with the CDMA systems of 800 MHz band or of 2 GHz band (S12).

When it is judged that the WiMAX system is solely operated, then whether or not to perform diversity receiving is judged (S13). When diversity receiving is performed, diversity is set so as to receive with a secondary receiving circuit 211 of the WiMAX system (S14), while diversity is prohibited so as not to receive with the secondary receiving circuit 211 of the WiMAX system when diversity receiving is not performed (S15).

On the other hand, when it is judged at S12 that the WiMAX system and the CDMA system are simultaneously operated, namely when hand-off between the systems or the like is performed, diversity receiving is prohibited so as not to receive with the secondary receiving circuit 121 and with the secondary receiving circuit 131 of the CDMA system at S15.

According to the multimode wireless communication apparatus 30 of the present embodiment, the transmitting circuit 201 or the receiving circuit 202 of the WiMAX system is selectively connected to the antenna 361 without the diplexer 31 not only when the WiMAX system is solely operated but also when the WiMAX system and the CDMA system are simultaneously operated. Thus, it is always possible to improve the receiving sensitivity and to reduce power consumption in the WiMAX system.

[Embodiment 4]

Figure 7:
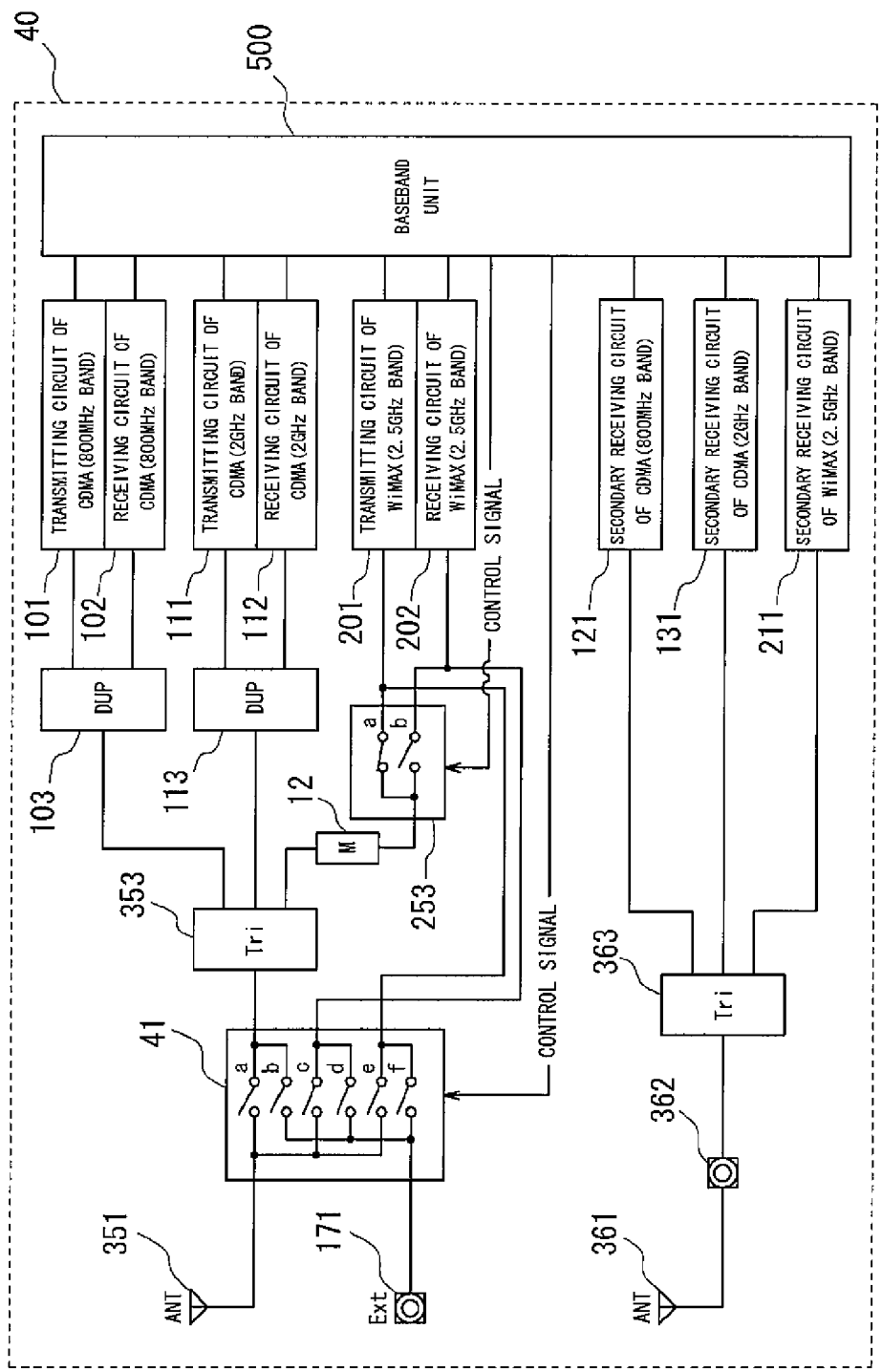
FIG. 7 is a block diagram illustrating a constitution of a main section of a multimode wireless communication apparatus of the fourth embodiment of the present invention.
Figure 14:
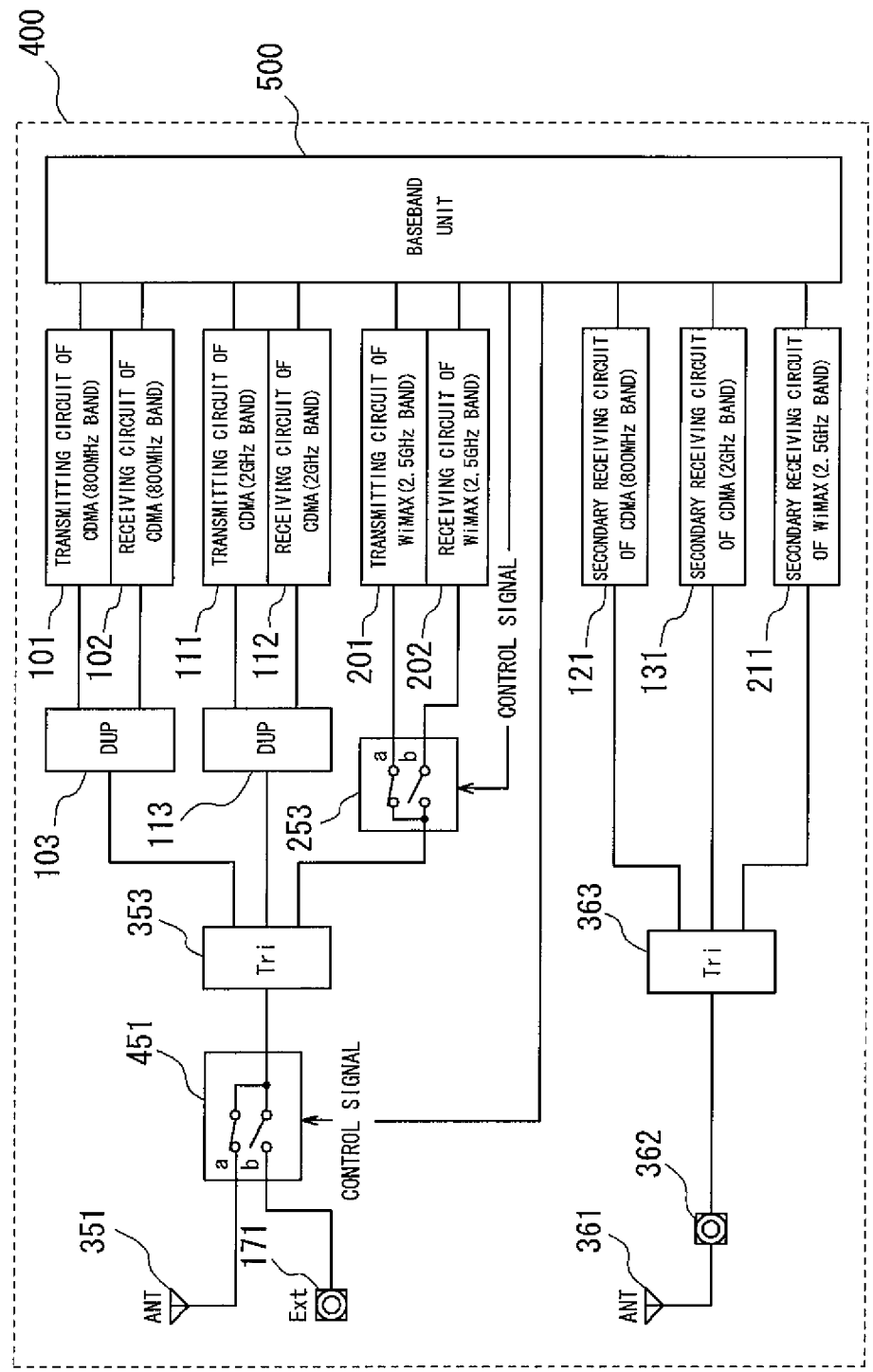
FIG. 14 is a block diagram illustrating another example of a conventional multimode wireless communication apparatus usable for both the CDMA system and the WiMAX system.

Shown in FIG. 7 is a block diagram illustrating a constitution of a main section of a multimode wireless communication apparatus of the fourth embodiment of the present invention. Although a multimode wireless communication apparatus 40 has a similar constitution to that shown in FIG. 14, the switch 451 is replaced with a switch 41 having six contact points a to f serving as an external antenna switching unit. The switch 41 is controlled based on the control signal from the baseband unit 500 so that, when the WiMAX system is solely operated, the transmitting circuit 201 or the receiving circuit 202 is connected to the antenna 351 or a secondary external connector 171 to which an external antenna can be connected, by way of the switch 41 without the switch 253 and the triplexer 353.

More specifically, when the WiMAX system is solely operated, the switch 253 is turned off at both of the contact points a and b, while the switch 41 is turned on and off at only the contact points e and c by control in synchronization with transmitting and receiving and turned off at the other contact points a, b and d so as to selectively connect the transmitting circuit 201 or the receiving circuit 202 to the antenna 351. Alternatively, the switch 41 is turned on and off at only the contact points f and d by control in synchronization with transmitting and receiving and turned off at the other contact points a, b, c and e so as to selectively connect the transmitting circuit 201 or the receiving circuit 202 to the second external connector 171. Therefore, in the present embodiment, the switch 253 constitutes a switching unit where the transmitting circuit 201 and the receiving circuit 202 are connected to the switch 41 serving as an external antenna switching unit by way of the triplexer 353 or directly without the triplexer 353.

Similarly to the case of the first embodiment, the matching circuit 12 is provided between the triplexer 353 and the switch 253 to prevent, when the switch 253 are turned off at both of the contact points a and b and the terminal at the demultiplexing side for 2.5 GHz band of the triplexer 353 is opened, influence on the impedance at the side of the antenna terminal.

When the WiMAX system and the CDMA system are simultaneously operated, the switch 253 are turned on and off at the contact points a and b by control in synchronization with transmitting and receiving of the WiMAX system, while the switch 41 are turned off at the contact points c to f and turned on at either one of the contact points a and b, so as to share the antenna 351 or the second external connector 171, by way of the triplexer 353, among the CDMA system of 800 MHz band, the CDMA system of 2 GHz band and the WiMAX system of 2.5 GHz band. Since other constitutions are the same as those shown in FIG. 14, the corresponding units are provided with the same reference symbols and the descriptions thereof will be omitted.

According to the multimode wireless communication apparatus 40 of the present embodiment, similarly to the case of the first embodiment, when the WiMAX system is solely operated, the transmitting circuit 201 or the receiving circuit 202 is directly connected, in synchronization with transmitting and receiving, to the switch 41 that switches the connection either to the antenna 351 or to the second external connector 171, without the triplexer 353. It is thus possible to reduce insertion loss of the circuit and, as a result, to improve receiving sensitivity and to reduce power consumption, as output power of the power amplifier on the transmitting circuit 201 can be reduced during transmitting.

[Embodiment 5]

Figure 8:
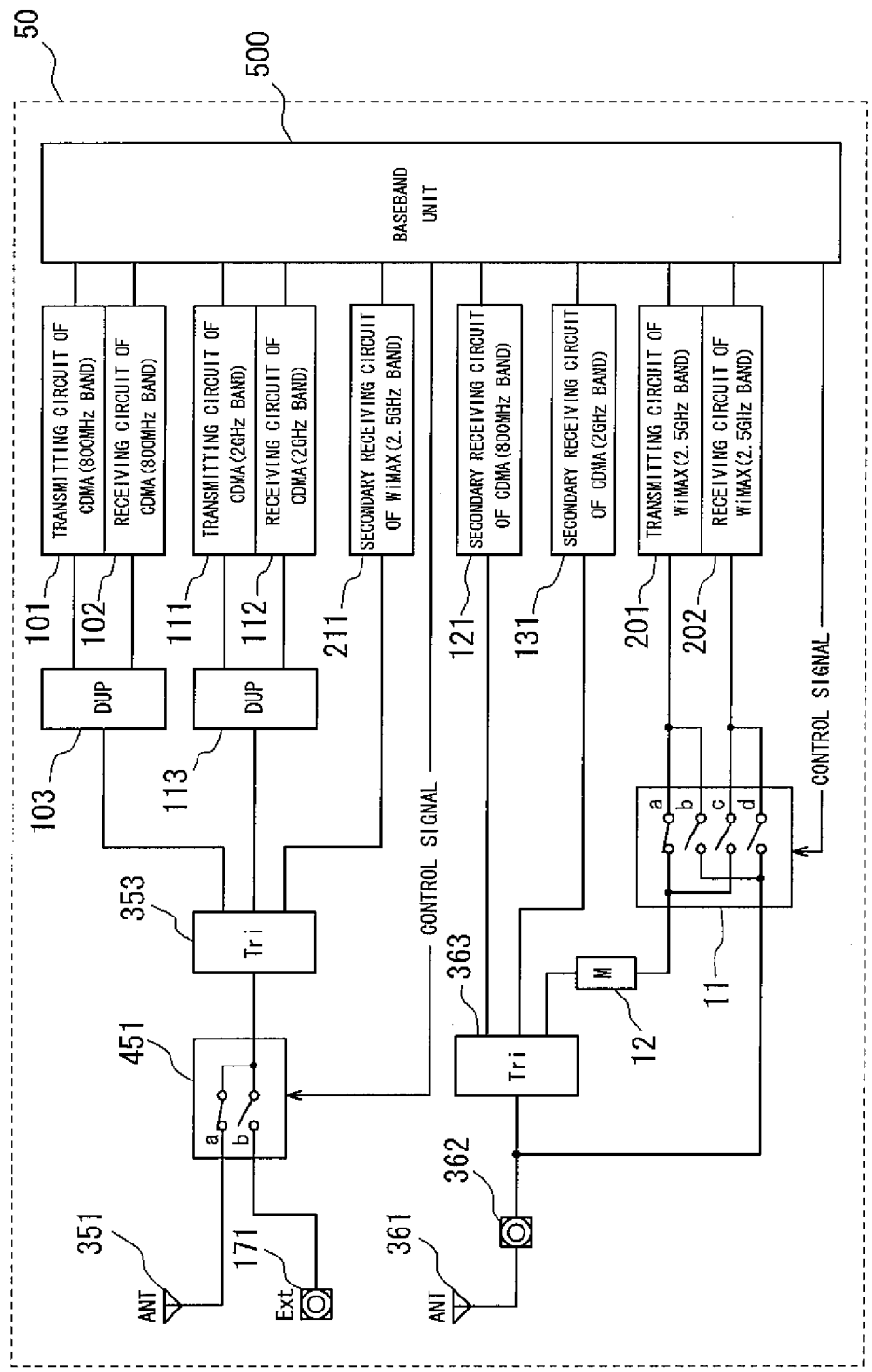
FIG. 8 is a block diagram illustrating a constitution of a main section of a multimode wireless communication apparatus of the fifth embodiment of the present invention.

Shown in FIG. 8 is a block diagram illustrating a constitution of a main section of a multimode wireless communication apparatus of the fifth embodiment of the present invention. Although the multimode wireless communication apparatus 50 has the similar constitution as that of the second embodiment shown in FIG. 4, the first external connector 352 at the side of the antenna 351 is replaced with the second external connector 171 and a switch 451 having two contact points a and b. The switch 451 is controlled based on the control signal from the baseband unit 500 and turned on at either one of the contact points a or b so as to connect the antenna terminal of the triplexer 353 to the antenna 351 or the second external connector 171. Other constitutions and performances are the same as those of the second embodiment.

In the present embodiment also, it is thus possible to obtain the similar effect as that of the second embodiment.

[Embodiment 6]

Figure 9:
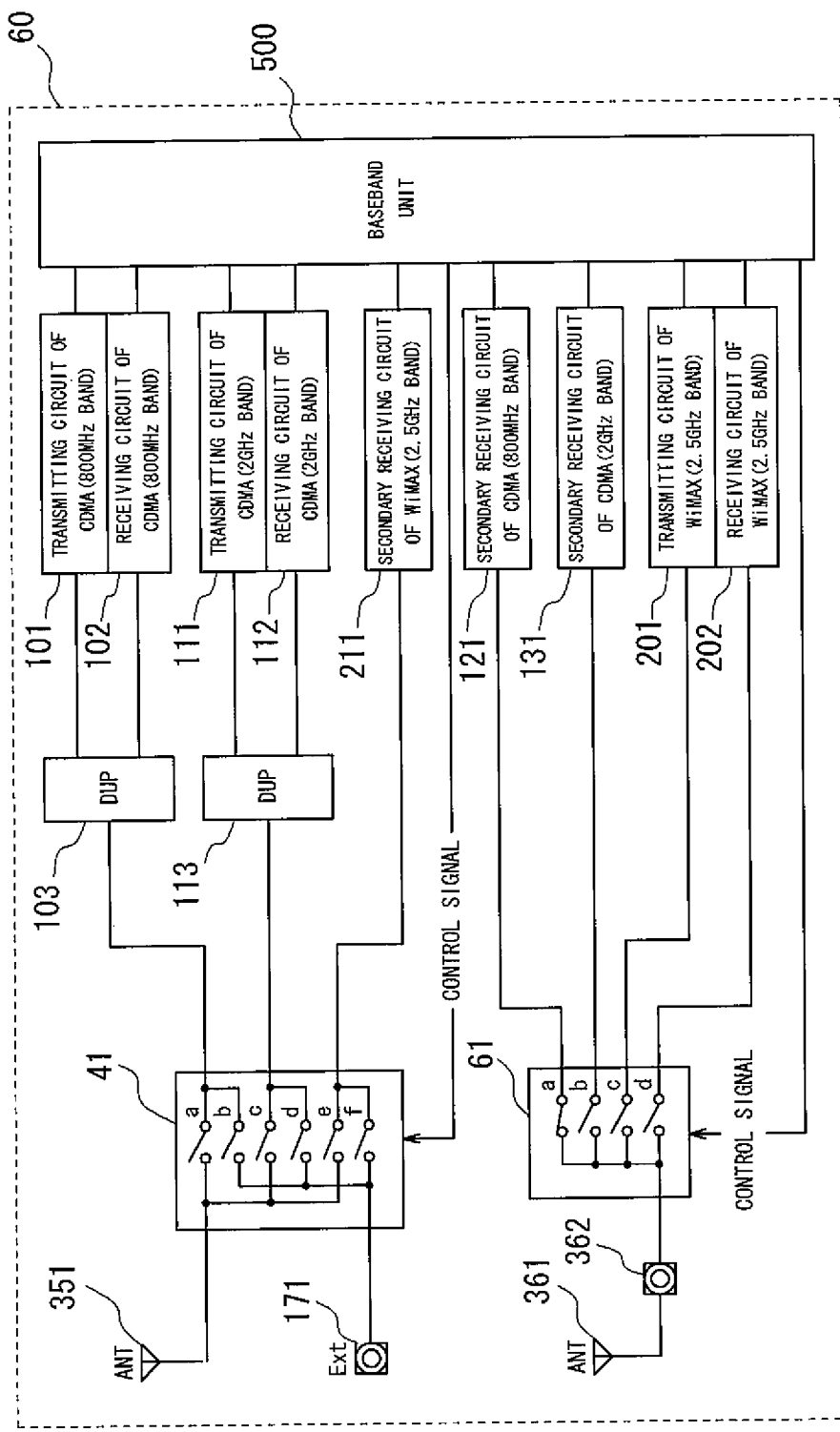
FIG. 9 is a block diagram illustrating a constitution of a main section of a multimode wireless communication apparatus of the sixth embodiment of the present invention.
Figure 10:
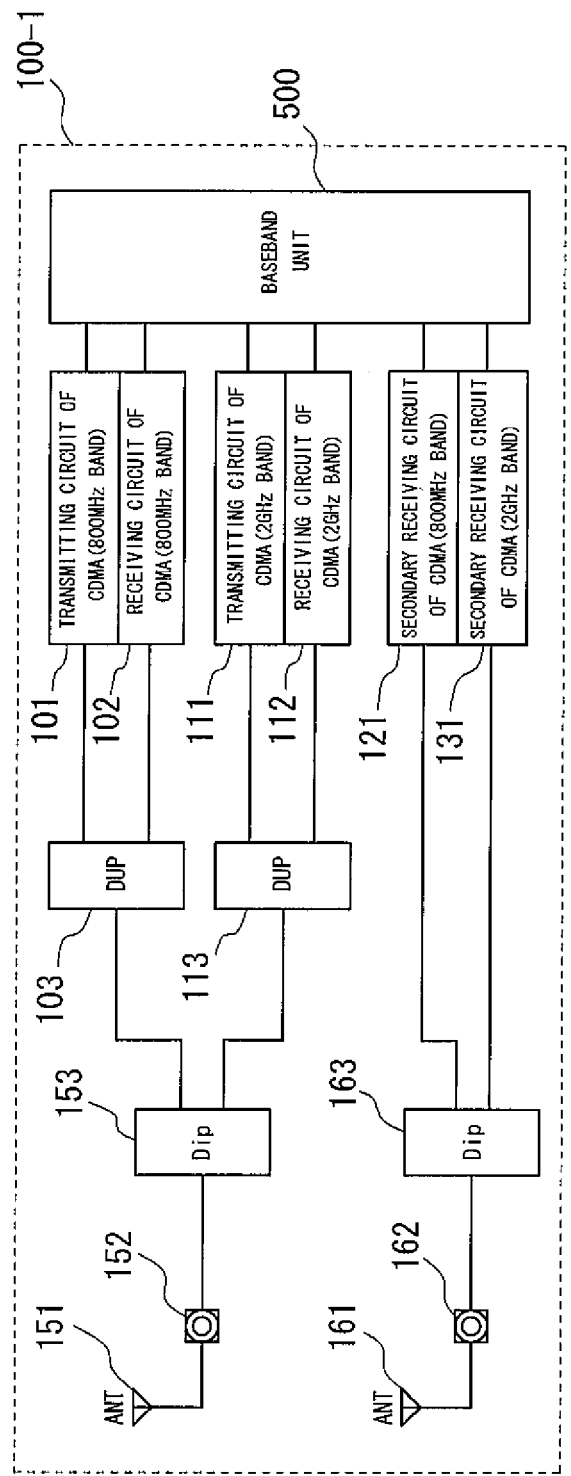
FIG. 10 is a block diagram illustrating an example of a conventional wireless communication apparatus used for CDMA system.
Figure 11:
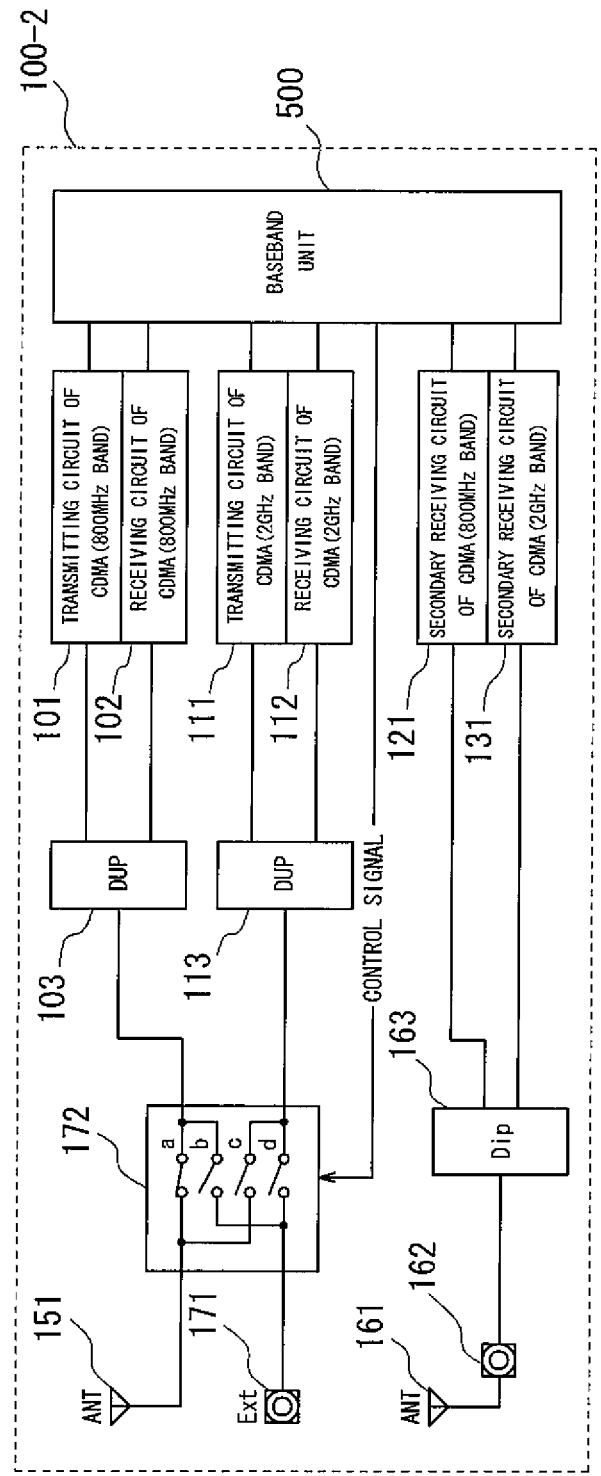
FIG. 11 is a block diagram illustrating another example of a conventional wireless communication apparatus used for the CDMA system.
Figure 12:
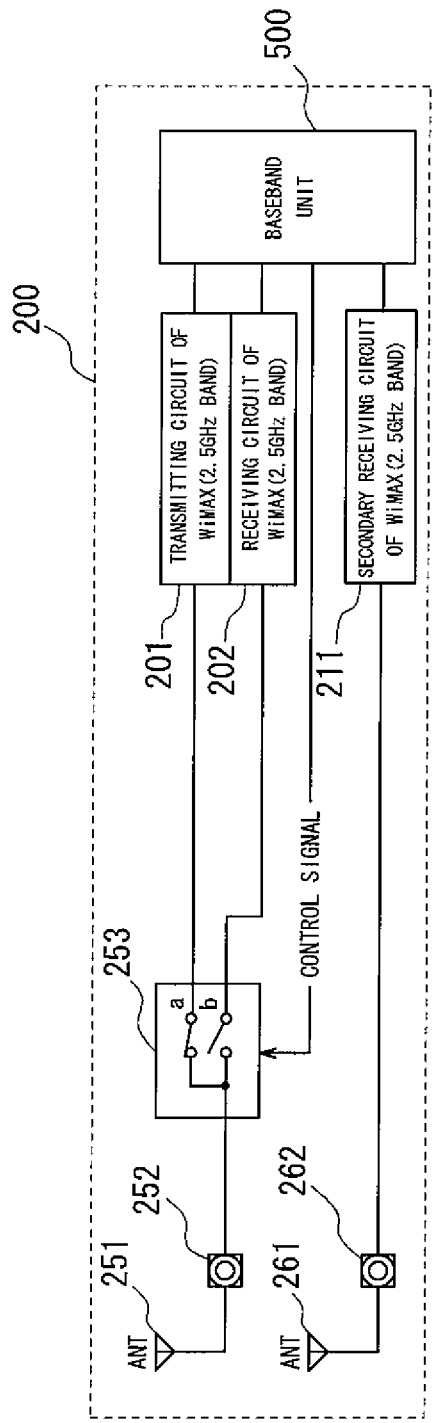
FIG. 12 is a block diagram illustrating an example of a conventional wireless communication apparatus used for the WiMAX system.

Shown in FIG. 9 is a block diagram illustrating a constitution of a main section of a multimode wireless communication apparatus of the sixth embodiment of the present invention. Although the multimode wireless communication apparatus 60 has a similar constitution as that of the fifth embodiment shown in FIG. 8, the switch 451 and the triplexer 353 at the side of the antenna 351 are replaced with the switch 41 having six contact points a to f. The switch 41 is controlled based on the control signal from the baseband unit 500 to share the antenna 351 and the second external connector 171 among the CDMA system of 800 MHz band, the CDMA system of 2 GHz band and the WiMAX system of 2.5 GHz band.

More specifically, for the transmitting circuit 101 and the receiving circuit 102 of the CDMA system of 800 MHz band, of the switch 41 is turned on at either one of the contact points a and b so as to connect the antenna terminal of the duplexer 103 to the antenna 351 or the second external connector 171, for the transmitting circuit 111 and the receiving circuit 112 of the CDMA system of 2 GHz band, the switch 41 is turned on at either one of the contact points c and d so as to connect the antenna terminal of the duplexer 113 to the antenna 351 or the second external connector 171, and for the secondary receiving circuit 211 of the WiMAX system of 2.5 GHz band, the switch 41 is turned on at either one of the contact points e and f so as to connect an input terminal of the secondary receiving circuit 211 to the antenna 351 or the second external connector 171.

In addition, in the fifth embodiment shown in FIG. 8, the switch 11, the matching circuit 12 and the triplexer 363 at the side of the antenna 361 are replaced with a switch 61 having four contact points a to d. The switch 61 is controlled based on the control signal from the baseband unit 500 to share a first external connector 362 and an antenna 361 among the CDMA system of 800 MHz band, the CDMA system of 2 GHz band, and the WiMAX system of 2.5 GHz band.

More specifically, the secondary receiving circuit 121 of the CDMA system of 800 MHz band, the secondary receiving circuit 131 of the CDMA system of 2 GHz band, the transmitting circuit 201 of the WiMAX system of 2.5 GHz band, and the receiving circuit 202 of the WiMAX system of 2.5 GHz band are connectable to the first external connector 362 and the antenna 361 by way of the contact point a, b, c or d of the switch 61 respectively. On or off at the contact points a to d is controlled based on the control signal from the baseband unit 500.

As stated above, since the transmitting circuit 201 and the receiving circuit 202 of the WiMAX system are connected to the antenna 361 without the triplexer 363 not only when the WiMAX system is solely operated but also when the WiMAX system and the CDMA system are simultaneously operated, receiving with the secondary receiving circuit of the CDMA system, namely diversity receiving, is prohibited when WiMAX system and the CDMA system are simultaneously operated, in the same manner as in the third embodiment.

The multimode wireless communication apparatus 60 of the present embodiment can reduce insertion loss of the circuit of each system because of omission of the triplexer 353 at the side of the antenna 351 and the triplexer 363 at the side of the antenna 361. It is thus possible to improve receiving sensitivity and to reduce power consumption in each system when a plurality of systems are simultaneously operated, and also to improve receiving performance by diversity receiving when each system is solely operated.

It is noted that the present invention is not limited to the above embodiments, and many variations and modifications can be made. For example, although the transmitting circuit 201 and the receiving circuit 202 of the WiMAX system of 2.5 GHz band are selectively connected to the side of the antenna terminal of the triplexer 353 by means of the switch 11 serving as the switching unit in the first embodiment, it is also possible to selectively connect the duplexer 103 of the CDMA system of 800 MHz band and the duplexer 113 of the CDMA system of 2 GHz band to the side of the antenna terminal of the triplexer 353 so as to connect a circuit to the antenna 351 directly without the triplexer 353 when the system is solely operated. Likewise, in the second to the fifth embodiments also, the duplexer 103 of the CDMA system of 800 MHz band or the duplexer 113 of the CDMA system of 2 GHz band can be selectively connected to the side of the antenna terminal of the triplexer 353 so as to connect a circuit directly to the side of the antenna terminal of the triplexer 353 without the triplexer 353 when the system is solely operated. Furthermore, it is also possible to connect secondary receiving circuit directly to the antenna or the second external connector by the switching unit without the demultiplexer such as the triplexer when the system is solely operated and diversity receiving of the system is performed.

It is noted that, although the multimode wireless communication apparatus of the above embodiments are for the CDMA system and the WiMAX system, the present invention is also applicable to a multimode wireless communication apparatus usable for arbitrary combination of a plural wireless communication systems including wireless LAN (Local Area Network) represented by IEEE (Institute of Electrical and Electronic Engineers) 802.11b, wireless WAN (Wide Area Network), for which IEEE802.20 is being standardized, and the like

The invention claimed is:

1. A wireless communication apparatus comprising:
an antenna;
a multiplexer/demultiplexer provided in downstream of the antenna for multiplexing/demultiplexing signals in different frequency ranges of a plurality of communication systems;
a transmitting circuit and a receiving circuit of each communication system provided in downstream of the multiplexer/demultiplexer;
a switching unit provided between a transmitting circuit and a receiving circuit of a communication system among the plurality of communication systems and the multiplexer/demultiplexer, wherein the switching unit is configured to switch connections of the transmitting circuit and the receiving circuit of the communication system to the antenna, and further to switch each of the connections between connection to the antenna via the multiplexer/demultiplexer and connection to the antenna directly without the multiplexer/demultiplexer on a basis of a number of the communication systems simultaneously operating; and
a control unit for controlling the switching unit so that, when the communication system having the switching unit and other communication system among the plurality of the communication systems are simultaneously operating, the transmitting circuit and the receiving circuit of each operating communication system is connected to the antenna by way of the multiplexer/demultiplexer and, when the communication system having the switching unit is operating and other communication system among the plurality of the communication systems are not operating, the transmitting circuit and the receiving circuit of the operating communication system is connected directly to the antenna without the multiplexer/demultiplexer.

2. The wireless communication apparatus according to claim 1,
further comprising a matching circuit provided between the multiplexer/demultiplexer and the switching unit,
wherein the switching unit is arranged so that the transmitting circuit and the receiving circuit of the corresponding communication system is connected to the antenna also by way of the matching circuit when connected to the antenna by way of the multiplexer/demultiplexer.

* * * * *